United States Patent
Bos et al.

(10) Patent No.: US 8,224,965 B2
(45) Date of Patent: Jul. 17, 2012

(54) METHOD FOR DELIVERY OF A SERVICE CONTROLLED ON A PER-BLOCK BASIS AND DEVICES FOR PERFORMING THIS METHOD

(75) Inventors: Lieve Maria Marcella Rosemarijn Bos, Vlimmeren (BE); Adrianus Johannes Van Ewijk, Antwerp (BE)

(73) Assignee: Alcatel Lucent, Paris (FR)

( * ) Notice: Subject to any disclaimer, the term of this patent is extended or adjusted under 35 U.S.C. 154(b) by 1852 days.

(21) Appl. No.: 10/902,126

(22) Filed: Jul. 30, 2004

(65) Prior Publication Data
US 2005/0027791 A1 Feb. 3, 2005

(30) Foreign Application Priority Data
Aug. 1, 2003 (EP) .................................... 03291955

(51) Int. Cl.
*G06F 15/16* (2006.01)
*G06F 15/173* (2006.01)
(52) U.S. Cl. ......................... 709/227; 709/226; 709/238
(58) Field of Classification Search .................... 709/227
See application file for complete search history.

(56) References Cited

U.S. PATENT DOCUMENTS

| | | | | |
|---|---|---|---|---|
| 5,317,415 A * | 5/1994 | Kinami et al. | ............... | 358/425 |
| 6,212,240 B1 * | 4/2001 | Scheibel et al. | ............... | 375/261 |
| 6,438,594 B1 * | 8/2002 | Bowman-Amuah | .......... | 709/225 |
| 6,741,606 B1 * | 5/2004 | Mori | ............................. | 370/463 |
| 7,191,211 B2 * | 3/2007 | Tuli | ............................... | 709/203 |
| 2002/0026520 A1 * | 2/2002 | Mendiola et al. | ............. | 709/230 |
| 2002/0082919 A1 * | 6/2002 | Landau et al. | .................. | 705/14 |

(Continued)

FOREIGN PATENT DOCUMENTS
WO   WO 02/17576 A2   2/2002

OTHER PUBLICATIONS

Database 'Online! Open Mobile Alliance: "Generic Content Download over the Air Specification, Version 1.0" retrieved from HTTP://XML.COVERPAGES.ORG/OMA-DOWNLOAD_OTA_V10-20020620.PFD, XP002264099.

(Continued)

*Primary Examiner* — Jeffrey Pwu
*Assistant Examiner* — Shaq Taha
(74) *Attorney, Agent, or Firm* — Sughrue & Mion, PLLC

(57) ABSTRACT

A method for controlled delivery of a service from a server (S) to a client (C), includes the steps of sending a download descriptor, from server (S) to client (C), retrieving of the service by the client, sending of a first type confirmation message by the client, activating the service by the client (C), wherein the service is first transformed within the server (S) into a sequence of individual blocks, wherein download descriptor (descn) and first type of confirmation message (confn) are generated and transmitted per at least one block of said sequence, and wherein the first type confirmation message (confn) is sent upon receipt of said at least one block by said client (C). Further improvements include the activation of block n being started before the total contents of block n being received, the first type of confirmation message (confn) for block n being generated upon the complete receipt of block n, and the download descriptor (descn+2) for block n+2 being generated and transmitted upon receipt of said first type confirmation message (confn) for block n.

32 Claims, 1 Drawing Sheet

U.S. PATENT DOCUMENTS

| | | | |
|---|---|---|---|
| 2002/0120730 A1 | 8/2002 | Goudzwaard et al. | |
| 2002/0184349 A1* | 12/2002 | Manukyan | 709/221 |
| 2003/0065747 A1* | 4/2003 | Sakamoto et al. | 709/219 |
| 2003/0081599 A1* | 5/2003 | Wu et al. | 370/389 |
| 2003/0172270 A1* | 9/2003 | Newcombe et al. | 713/168 |
| 2004/0078341 A1* | 4/2004 | Steichen | 705/64 |
| 2004/0103192 A1* | 5/2004 | Yli-Korhonen et al. | 709/224 |
| 2005/0027791 A1* | 2/2005 | Bos et al. | 709/200 |
| 2006/0041505 A1* | 2/2006 | Enyart | 705/40 |

OTHER PUBLICATIONS

Nokia: "On-the-phone Content Preview, Service Developers' Guide, Version 1.0" Forum Nokia, Mar. 26, 2002, pp. 1-8, XP002253214.

Nokia: OTA download for generic content, specification, version 1.0 Forum Nokia, Mar. 25, 2002, pp. 1-25, XP002253213.

Database 'Online! Open Mobile Alliance: Generic Content Download over the Air Specification, Version 1.0, Version Dec. 19, 2002.

* cited by examiner

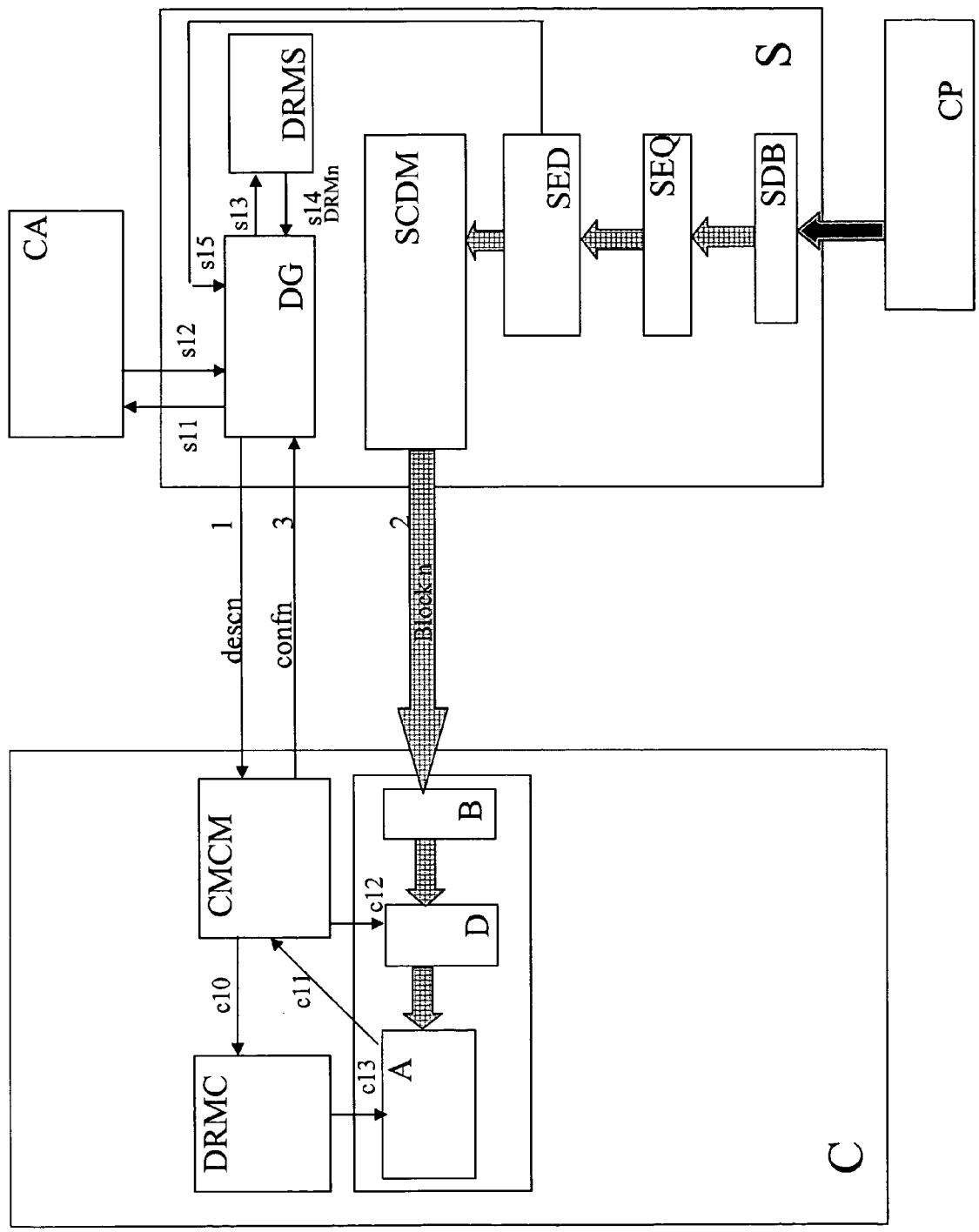

METHOD FOR DELIVERY OF A SERVICE CONTROLLED ON A PER-BLOCK BASIS AND DEVICES FOR PERFORMING THIS METHOD

FIELD OF THE INVENTION

The present invention relates to a method for controlled delivery of a service as is further described in the preamble of claim 1.

BACKGROUND

A related method for controlled delivery of a service is already known in the art, e.g. from "*the Open Mobile Alliance—Generic Content download over the air Specification Version* 1.0 *of Dec.* 19, 2002". Therein, a method for confirmed download to deliver digital content such as entertainment and business applications is described. This method includes the steps of sending a download descriptor by the server to the client terminal, this download descriptor including information with respect to the type and location of the content to be downloaded, and optionally a request for either a confirmation or an error report depending on whether the service will be successfully downloaded or not, retrieving, by said client terminal from said server, of the application sending, by the client terminal, of a first confirmation message to the server activating the service by the client.

This method for controlled downloading has however several drawbacks. The main drawback being that in case of a network failure, the prior art download mechanism provides no way for the client terminal to identify which part of the content was not received.

SUMMARY

An object of the present invention is therefore to provide a method for the controlled delivery of a service which solves the aforementioned problems which were inherent to the prior art method for controlled download of a service.

According to the invention, this object is achieved due to the fact that said method includes the steps as described in the characterising portion of the first claim.

The transformation of the service into a sequence of individual blocks, such that download descriptor and confirmation messages are generated and transmitted per block, thus allows to track exactly which blocks are received and which not, such that the prior art problem is adequately solved.

An additional characteristic feature of the present invention is described in claim 2.

These additional features further improve the method such as to make it more suitable for streaming type of services. Another drawback of the prior art method was indeed that this prior art mechanism did not allow the client terminal to already start the service during the delivery itself, which means that this prior art download mechanism could not be used for such streaming type of services. Streaming type of services are to be understood throughout the meaning of this text as all services of which the activation starts as soon as the initial bits of the service are received, while the rest of the service is still concurrently delivered. Since the service activation already starts before a complete block is received, concurrent delivery and activation is thus possible. By the fact that upon receipt of the first confirmation message for block n, by the server, the descriptor for block n+2 is generated and transmitted, the content delivery of block n+1 is taking place while the client is already prepared for retrieval of block n+2.

An additional characteristic feature of the present invention is described in claim 3.

By the inclusion, within the descriptor, of user rights information such as DRM information which is further used by a client DRM device (DRMC) within the client, such that the service activation is dependent upon this information, the server has full control over the activation or eventual blockage of the service. Furthermore this also opens possibilities for billing based on the actual service usage, taking only into account those parts of the content that were successfully received/confirmed by the client to the server. In addition to the user rights information, credit information may also be included in the download descriptor or attached to the different blocks, as is stated in claim 4.

This user rights information may however also be inserted or attached to the data blocks of the service as described in claim 5. Claim 6 further describes that the download descriptor can be part of a second type of confirmation message, which are present in some protocols such as the aforementioned prior art OMA protocol. This thus ensures compatibility with existing protocols, enhancing the versatility of the method.

Claim 7 further specifies that the blocks can be encrypted. The encryption keys per block can be part of the descriptor, as stated by claim 8, or may be transmitted separately before the transmission of the block, as stated in claim 9. If no re-keying is needed during transmission and the blocks all use the same encryption key, this key can be also sent initially in a separate message, or be part of the first descriptor. Another possibility is that it can be based on a previously known shared secret between client and server.

Claim 10 states that for the activation of a new service, the method starts with the transmission of the download descriptor of the first and second blocks of this service.

The present invention relates as well to a server and a client which are able to perform the steps of the aforementioned method, as described in claims 11 to 26.

BRIEF DESCRIPTION OF THE DRAWINGS

The above and other objects and features of the invention will become more apparent and the invention itself will be best understood by referring to the following description of an embodiment taken in conjunction with the accompanying drawing wherein the figure represents schematics of a client and a server device, as well as the messages exchanged between them for the realisation of the subject method.

THE DESCRIPTION OF AN EMBODIMENT

The method of the invention concerns a method for confirmed and reliable provisioning of services from a server S to a client C. The service data themselves can for instance be delivered by a content provider CP to the server S. As opposed to for instance the OMA-download mechanism, where entire files first have to be downloaded from the server to the client, before they may be activated in the client, the server S first will transform the to be transmitted service, into a sequence of blocks. This is performed within device SEQ, which thus gets the entire service file provided by the service provider, from for instance a data buffer SDB within the server S, and which transforms this entire service file represented by the thick arrow, into a sequence of blocks, schematically represented by the thick blocked arrow. These blocks are delivered to a server content dispatching module SCDM. This module is able to communicate with other devices such as the client C.

The server S further includes a descriptor generator DG which generates, for each block or group of blocks to be separately transferred, a download descriptor per block or group of blocks. This block download descriptor includes for each block to be transmitted, data such as an identifier, the individual size of the block, the location indicating where to retrieve the block and optionally a request for either a confirmation or an error report depending on whether the client considers the block to be retrieved with satisfactory quality to continue with the rest of the service and optionally a request for re-keying which will be discussed in a further paragraph. In some embodiments, such as the one depicted on the figure, the block descriptor also includes user rights information denoted DRMn and which can for instance consist of Digital Rights Management information as standardized in the "Open Mobile Alliance —OMA DRM architecture Specification Version 1.0 of July, 2003". This user rights information is obtained from a Server DRM device, denoted DRMS, and will be further discussed in a further paragraph.

For streaming type of services the method starts with the transmission of the descriptors of the first two blocks of the service. After transmission by the server and receipt by the client of the descriptors for block 1 and 2, the client can proceed with retrieving these blocks from the content dispatching module in the server. This retrieval may include a first request for the first two data blocks followed by the delivery of this first and second data block by the server. This is not shown in the figure; in some embodiments the server immediately pushes the information blocks to the client after having sent the download descriptors for these blocks. If the client judges that the first of both data block was delivered with satisfactory quality to continue with the rest of the service, the client responds after receipt of the end of this first block, preferably but not necessarily before the end of the retrieval of the second block, by generating and transmitting a first type confirmation message to the server concerning the receipt of this first block. The server S which receives this first type of confirmation message for block 1, then immediately proceeds by generating a descriptor for the next block 3, while this server may also still be busy with transmitting the data for block 2.

The transmission of the blocks from the server to the client is performed by the server content dispatching module SCDM, as is shown in the figure.

In some embodiments, in order to generate the descriptor for block 3, the server may proceed with first checking the credit of the client, for instance via requesting this information from a credit agent CA. If this credit is still high enough such that the client is still allowed to receive a next block 3, the descriptor generator DG within the server generates a new descriptor for this next block 3. Depending on the variant of the method concerned, the descriptor generator also consults the server DRM device DRMS for obtaining from this module the necessary user rights information for block 3, which is subsequently to be inserted within the download descriptor of block 3.

In the embodiment depicted in the figure it is the descriptor generator DG which first consults the credit agent, and, depending on the outcome of this consultation, next consults the server DRM device DRMS. In other embodiments, the server DRM device can autonomously consult this credit agent CA, such that the descriptor generator only communicates with the server DRM device DRMS. For these embodiments, and in case the server DRM device obtains from the credit agent the information that the client has not enough credit for receiving this next block 3, the DRM device either adds this credit info to the existing DRM information, or sends no DRM information at all to the descriptor generator. The latter thus generates a download descriptor without DRM information, whereby the discovery of this by the client will also block the client from further activating the service. In other embodiments, the descriptor generator may also block the SCDM to send further blocks. In other embodiments and variants, DRM still provides user rights information to the descriptor generator DG, but this user rights information then for instance includes an extra field indicating that the user has no longer the rights to activate the received data blocks, for instance, to play further blocks of the movie.

In general, after transmission of the descriptor for a block n, this descriptor being denoted descn, and which step is indicated by the arrow 1 from server to client, the client proceeds with retrieving the block n concerned, from the content dispatching module SCDM in the server. This retrieving step may thus include a first request for this data block n, (not shown in the figure), followed by the delivery of the data block n, denoted blockn, by the server S. The latter is shown on the figure by means of the thick blocked arrow denoted blockn from SCDM to buffer means B of the client. The buffer further transfers this block to the service activator A, which then judges whether this block n was delivered with satisfactory quality to continue with the rest of the service. If this block was delivered with sufficient quality, it generates a control signal denoted c11 to CMCM, which thereupon reacts, preferably before the end of the possibly already started retrieval of next block n+1 by B, by generating and transmitting a first type confirmation message for this block n. This first type confirmation message for block n is denoted confn, its transmission from client to server by means of the thin arrow 3. This number indicates that this step concerns the third one in the already mentioned sequence of steps.

In the figure the CMCM device of the client generates this first type of confirmation message, upon receipt of a control signal c11 from the service activator means indicating the successful receipt of data block n. However other modules within the client may generate confn. Similarly, in the figure it is the descriptor generator module DG of the server S which receives this first type of confirmation confn, but other communication modules of the server may be used to receive this message.

In the already described variant of the method and associated embodiment of the server, the descriptor generator DG, upon receipt of the confirmation message confn from the client, first and autonomously checks the credit of the client, for instance via requesting this information from a credit agent CA. This is represented by means of request signal s11 from DG to CA, and the response message s12 including this credit information from CA to DG. If this credit is still high enough to receive a next block n+2, the descriptor generator DG proceeds with consulting the server DRM device DRMS for obtaining from this module the necessary user rights information for block n+2, which is subsequently inserted within the download descriptor of block n+2. This is schematically represented in the figure by the request message s13 from DG to DRMS, and the subsequent response s14 from DRMS to DG, which includes DRMn, the user rights information for block n. If the credit of the client is not high enough, the descriptor generator will either insert no user rights information, or will, add an additional field in the descriptor, indicating that no credit is available. Possibly also a control signal will be sent to the SCDM to prevent further transmission.

Still other variants of the method exist wherein this user rights information is never included in the descriptor, and where even the consultation of the credit agent is not performed. In yet other variant methods the credit information is inserted in the descriptor, or added to the data service blocks themselves. These embodiments are not shown in the figure.

Still, it remains that, upon receipt of the first type of confirmation message for block n, the server proceeds with already generating a descriptor for block n+2. This next descriptor can be part of a second type of confirmation message from server to client, but this is not mandatory.

The client itself includes a client communication means CMCM and a data receipt module or buffer means B. The client communication means CMCM receives the descriptor or the messages including this descriptor from the server, extracts, if necessary, the descriptor or the credit information therefrom, and further extracts from the descriptor the information concerning the block or blocks that will follow. This information concerns a block identifier, the size of the block concerned, and, depending on the variant of the method also user rights information such as for instance DRM information and possibly also a user credit indication in case not separately found in the message from the server. In some embodiments the credit information can indeed also be a part of the user rights information while in other embodiments this is provided as separate information.

In the client C, the user rights information and/or the credit information is further transferred by means of signal c10, to a client DRM device denoted DRMC in the figure. For other variant of the methods, implemented by other embodiments of the client (not shown), the DRM information and/or credit information, is attached to or included within the data blocks themselves. In this case, this DRM information and/or user credit information is then to be extracted from the data blocks or to be detached from them. For these variant embodiments, the client DRM device needs to be coupled to or even included in the buffer means B. In either case, the specific DRM and/or credit information is (temporarily) stored within the client DRMC device, which delivers it further to the service activator A by means of signal c13.

Depending on the usage rules described in the DRM information, the DRM agent enables or disables a service activation means A to act upon the block of the service concerned. The actions enabled by the DRM information can include service execution, storage, forwarding, etc. Each service block is retrieved from the server by the data receipt module B in the client. Upon successful receipt of the block concerned, which checking is performed by the service activation means A, this module triggers via signal c11 the message communication module CMCM of the client, which thereupon generates the first confirmation message for the block under consideration.

The descriptor for the first block further includes information concerning the total size of the entire streaming file, and further details about the service itself such as required platform/software to activate the service etc. These details are however beyond the present invention and will accordingly not be further discussed.

This invention is thus particularly suited for controlled delivery, and associated billing, of all kinds of services since it allows the server to control and bill per block. Furthermore, the embodiment whereby the descriptors are generated and transmitted on forehand, and the service is started before an entire block is downloaded also allow the client to activate the service, for instance playing a movie, from the first block downloaded. This embodiment is thus also particularly suited for streaming type of services. The billing takes place via the credit agent, which at the same time indirectly controls per block the start or stop of the service activation at the client side by either allowing the user rights information to be inserted or not, by having the user rights information to be adapted such as to include this enabling credit information or not or to simply have this enabling credit information to be inserted in the descriptor or in the message including the descriptor. If the client DRMC device discovers the information that the client is no longer allowed to activate the next blocks of the service, this DRMC device thus blocks or disables the service activator from further activating the service, for instance stops the playing of the movie at a certain point in time.

The invention may be further refined by adding encryption to the blocks. This is performed within the server by means of a Server Encryption Device SED. The encryption key can be the same for all blocks of the service, or may be different from block to block. For streaming services the encryption key for a particular block has to be preferably delivered to the client before the block itself, such as to enable the client to immediately start activating the service upon receipt of the blocks of its content as is needed for streaming type of services. The encryption key may be sent as part of the descriptor for the particular block, possibly part of the DRM information, or may be sent in a separate key message. In the figure the situation is shown where the SED delivers the key information to the descriptor generator DG via message s15, which accordingly inserts the key in the descriptor.

In case the entire streaming file will be encrypted with the same key, the key can be sent initially as one separate initial message, or in the descriptor of the first block. In case a dedicated key for each block is foreseen, for enhanced security and controllability, this key is sent after the credit check, thus either in the descriptor or in a separate message, but, in case of streaming services, before the retrieval of the corresponding block. In case the credit check indicates that the client does not have enough credit for activating the next blocks, the server may optionnaly decide to re-key without sending the new key to the client. In this case a control signal is to be foreseen between the descriptor generator and the encryption device SED. This enhances the controllability of the present invention.

Within the client, the encryption key information is received within the Client Message Communication Module CMCM, extracted therein and transmitted to a Client Decryptor Device D, either part of the service activation means A, or either a separate entity. In the figure it is depicted as a separate entity, coupled to the buffer means B. Of course other implementations are possible.

This method thus allows the client C to identify blocks that get lost in the transmission. Furthermore the server S, and coupled content provider CP, can throw out malicious users either by changing the client credibility information in the descriptor, by giving them the wrong key, or by re-keying each block and no longer providing them the key. Users cannot cheat anymore by for instance telling after the end of the transmission that they only received part of the blocks since now an explicit confirmation message for each separate block is required. Furthermore this mechanism enables servers and content provides to better track user behavior. The mechanism works as well in case some blocks are empty, e.g. during a sequence of separate short clips with pauses in between.

The method can be applied for any type of services, either streaming services or not, is also suitable for progressive delivery services, but can as well be applied to conventional traditional download where the service activation only takes place after the complete download, and is applicable to multicast/broadcast type of transmissions to a large group of users. The method is network independent, i.e. it is applicable to both fixed and mobile networks.

A simplification exists in case all blocks have equal size and in case the server has checked that the client has enough credit to download and activate the entire service file. Confirmation per block however ensures to keep track which blocks were actually retrieved by the client and which not.

While the principles of the invention have been described above in connection with specific apparatus, it is to be clearly understood that this description is made only by way of example and not as a limitation on the scope of the invention, as defined in the appended claims.

The invention claimed is:

1. A method for controlled delivery of a service from a server to a client comprising:
   sending at least one download descriptor for a block by the server to the client,
   retrieving the service by the client from the server,
   sending at least one first type confirmation message by the client to the server,
   activating the service by the client,
   wherein the service is first transformed within the server into a sequence of individual blocks,
   wherein the at least one download descriptor and the at least one first type confirmation message are generated and transmitted per at least one block of said sequence,
   wherein the at least one first type confirmation message is sent upon receipt of the at least one block by said client, and
   wherein a download descriptor for a block n+1 is generated by the server while a block n is transmitted by the server.

2. The method according to claim 1,
   wherein the activation of the block n starts before a total content of the block n is received,
   wherein the at least one first type confirmation message for the block n is generated upon the complete receipt of the block n, and
   wherein upon receipt of said at least one first type confirmation message for the block n, by the server, a download descriptor for a block n+2 is generated and transmitted by said server.

3. The method according to claim 1, wherein said at least one download descriptor for said block or a message including said at least one download descriptor for said block, further includes user rights information for said block, for use by a client DRM device in said client, on the basis of which said client DRM device may authorize the activation of said block by said client.

4. The method according to claim 1, wherein, upon receipt of said at least one first type confirmation signal for said block n by said server, said server performs a credit check of said client, and accordingly either inserts credit information in said download descriptor for a block n+2 or adds said credit information to the block n+2.

5. The method according to claim 3, wherein said user rights information for said block is attached to or inserted within said block.

6. The method according to claim 1, wherein said at least one download descriptor for a block n+2 is inserted in a second type of confirmation message, generated by said server upon receipt of said at least one first type of confirmation message for the block n.

7. The method according to claim 1, wherein said individual blocks are further encrypted within said server.

8. The method according to claim 7, wherein said at least one download descriptor for said block includes an encryption key for said block.

9. The method according to claim 6, wherein said encryption key for said block is transmitted in a separate message.

10. The method according to claim 1, wherein for the activation of a new service, said method starts with transmitting the at least one download descriptor for the first two blocks of the sequence of said new service.

11. A server for controlled delivery of a service comprising:
    a descriptor generator for generating and transmitting a download descriptor to a client, and for retrieving from said client a first type confirmation message,
    wherein the server further comprises a sequencing device for transforming the streaming service into a sequence of individual blocks,
    wherein the descriptor generator is adapted to generate and to transmit the download descriptor for at least one block of the sequence and to receive the first type of confirmation message that is sent upon receipt of the at least one block of the sequence, and
    wherein a download descriptor for a block n+1 is generated by the descriptor generator while a block n is transmitted.

12. The server according to claim 11, wherein said descriptor generator generates and transmits the download descriptor for block n+2 upon receipt of the first type confirmation message for the block n from said client.

13. The server according to claim 11, wherein said descriptor generator is further adapted to obtain user rights information concerning a particular block, from a Server DRM Device of said server, and to insert said user rights information for said particular block into said download descriptor for said particular block or in a message including said download descriptor for said particular block.

14. The server according to claim 11, wherein, upon receipt of a first type confirmation message for said block n by said descriptor generator, said descriptor generator is adapted to perform a credit check of said client, and to accordingly insert credit information in download descriptor for a block n+2.

15. The server according to claim 13, wherein said server includes means for inserting or attaching said user rights information or said credit information for a particular block to said particular block.

16. The server according to claim 11, wherein said descriptor generator is adapted to generate a second type of confirmation message, upon receipt of said first type confirmation message for said block n, and to include a download descriptor for a block n+2 within said second type confirmation message.

17. The server according to claim 11, wherein said server includes an encryption device for encrypting said individual blocks of said sequence.

18. The server according to claim 17, wherein said descriptor generator is adapted to include the encryption key for a block in the download descriptor of said block, in the message including said download descriptor for said block, or in a separate message.

19. The server according to claim 11, wherein said descriptor generator starts with generation and transmission of the download descriptors for the first two blocks of a new service.

20. A client for receiving and executing a service comprising:
    client message communication means for receiving a download descriptor from a server,
    buffer means for receiving the service from the server, wherein the client message communication means further being adapted to generate a first type confirmation message to the server upon successful receipt of the service by the buffer means, the client further comprising service activation means for activating the service, wherein the buffer means is further adapted to receive from the server a sequence of individual blocks of the service, wherein the client message communication means is further adapted to receive a download descriptor per at least one block of the sequence, to generate and to transmit the first type of confirmation message per at least one block of the sequence, wherein the first type confirmation message is sent upon successful receipt of the at least one block by the buffer means, and wherein a download descriptor for a block n+1 is generated by the server while a block n is transmitted by the server.

21. The client according to claim 20, wherein said service activation means starts activating the block n before the total contents of the block n is received by said buffer means and wherein the first type of confirmation message for block n is generated upon the complete receipt of block n.

22. The client according to claim 20, wherein said client communication means is further adapted to extract from said download descriptor for said at least one block or from the message including said download descriptor for said at least one block, user rights information concerning said at least one block, for delivery to a client DRM device in said client, which is further adapted to analyze said user rights information and to, depending on the result of said analysis, authorize said service activation means to execute said block.

23. The client according to claim 20, including means for extracting said user rights information from or attached to a block received in said buffer means.

24. The client according to claim 20, wherein said client communication means is further adapted to receive a second type of confirmation message from said server and to extract therefrom said download descriptor.

25. The client according to claim 20, further including a decryption device coupled to said buffer means and adapted to decrypt individual blocks from said buffer means for further transfer to said service activation means.

26. The client according to claim 25, wherein said client communication means is adapted to extract an encryption key for a block from said download descriptor for said block and to deliver said encryption key to said decryption device.

27. The method according to claim 1, wherein the at least one download descriptor comprises at least one of an identifier, an individual size of the at least one block and a location indicating where to retrieve the at least one block.

28. The server according to claim 11, wherein the download descriptor comprises at least one of an identifier, an individual size of the at least one block and a location indicating where to retrieve the at least one block.

29. The client according to claim 20, wherein the download descriptor comprises at least one of an identifier, an individual size of the at least one block and a location indicating where to retrieve the at least one block.

30. The method according to claim 1, wherein the at least one download descriptor for the block is transmitted separately from the block.

31. The server according to claim 11, wherein the download descriptor for the at least block is transmitted separately from the at least one block.

32. The client according to claim 20, wherein the download descriptor for the at least block is transmitted separately from the at least one block.

* * * * *